US008971865B2

(12) United States Patent
Bychkov et al.

(10) Patent No.: US 8,971,865 B2
(45) Date of Patent: Mar. 3, 2015

(54) CONVERGED CORDLESS AND CELLULAR PHONE SYSTEM

(75) Inventors: Eyal Bychkov, Hod Hasharon (IL); Tal Engelstein, Ramat Gan (IL); Yair Leshem, Tel Aviv (IL); Uri Ron, Tel Aviv (IL); Uriel R. Brison, Tel Aviv (IL); Sigalit Klimovsky, Tel Aviv (IL)

(73) Assignee: Google Inc., Mountain View, CA (US)

( * ) Notice: Subject to any disclaimer, the term of this patent is extended or adjusted under 35 U.S.C. 154(b) by 859 days.

(21) Appl. No.: 12/369,915

(22) Filed: Feb. 12, 2009

(65) Prior Publication Data

US 2009/0156188 A1     Jun. 18, 2009

Related U.S. Application Data

(63) Continuation-in-part of application No. 12/237,399, filed on Sep. 25, 2008.

(60) Provisional application No. 60/995,575, filed on Sep. 26, 2007, provisional application No. 61/062,171, filed on Jan. 23, 2008, provisional application No. 61/063,668, filed on Feb. 5, 2008, provisional application No. 61/080,264, filed on Jul. 13, 2008.

(51) Int. Cl.
| | |
|---|---|
| H04M 3/42 | (2006.01) |
| H04W 4/00 | (2009.01) |
| H04M 1/00 | (2006.01) |
| H04M 1/725 | (2006.01) |
| H04W 8/08 | (2009.01) |
| H04W 88/10 | (2009.01) |

(52) U.S. Cl.
CPC ...... *H04M 1/72513* (2013.01); *H04M 1/72527* (2013.01); *H04W 8/08* (2013.01); *H04W 88/10* (2013.01)

USPC ............ 455/417; 455/426.1; 455/553.1

(58) Field of Classification Search
CPC ........ H04W 24/02; H04W 8/245; G06F 8/65
USPC .......................................... 455/417, 426, 553
See application file for complete search history.

(56) References Cited

U.S. PATENT DOCUMENTS

| | | | |
|---|---|---|---|
| 5,625,673 | A | 4/1997 | Grewe et al. |
| 5,628,055 | A | 5/1997 | Stein |

(Continued)

FOREIGN PATENT DOCUMENTS

| | | |
|---|---|---|
| EP | 1871075 A1 | 12/2007 |
| WO | 9421058 A1 | 9/1994 |

(Continued)

*Primary Examiner* — Mahendra Patel
*Assistant Examiner* — Natasha Cosme
(74) *Attorney, Agent, or Firm* — Soquel Group LLC

(57) ABSTRACT

An integrated cordless and cellular phone system, including a base station for one or more cordless phones, the base station being served by a fixed line telephone network operator, including one or more slots for attaching one or more cellular phone modules therein, the cellular phone modules being served by corresponding cellular network operators, wherein each of the one or more slots is associated with a corresponding cordless phone, and call routing circuitry (i) for identifying an incoming call to the base station as being intended for a specific one of the cellular phone modules, and (ii) for routing the incoming call to the cordless phone that is associated with the slot to which the specific cellular phone module is attached. A method is also described and claimed.

18 Claims, 8 Drawing Sheets

(56) References Cited

U.S. PATENT DOCUMENTS

| | | | |
|---|---|---|---|
| 5,675,629 A | 10/1997 | Raffel et al. | |
| 5,809,115 A | 9/1998 | Inkinen | |
| 5,893,037 A | 4/1999 | Reele et al. | |
| 5,907,815 A | 5/1999 | Grimm et al. | |
| 6,044,145 A * | 3/2000 | Kelly et al. | 379/265.02 |
| 6,188,917 B1 | 2/2001 | Laureanti | |
| 6,201,867 B1 | 3/2001 | Koike | |
| 6,243,578 B1 | 6/2001 | Koike | |
| 6,477,357 B1 | 11/2002 | Cook | |
| 6,516,202 B1 | 2/2003 | Hawkins et al. | |
| 6,640,113 B1 | 10/2003 | Shin et al. | |
| 6,690,947 B1 | 2/2004 | Tom | |
| 6,898,283 B2 | 5/2005 | Wycherley et al. | |
| 6,907,264 B1 | 6/2005 | Sterkel | |
| 6,987,988 B2 * | 1/2006 | Uchiyama | 455/557 |
| 6,999,792 B2 | 2/2006 | Warren | |
| 7,085,542 B2 | 8/2006 | Dietrich et al. | |
| 7,194,285 B2 | 3/2007 | Tom | |
| 7,251,484 B2 * | 7/2007 | Aslanian | 455/426.1 |
| 7,266,391 B2 | 9/2007 | Warren | |
| 7,412,257 B2 * | 8/2008 | Loveland | 455/554.2 |
| 7,477,919 B2 | 1/2009 | Warren | |
| 7,515,937 B2 | 4/2009 | Lee | |
| 2002/0090980 A1 | 7/2002 | Wilcox et al. | |
| 2002/0151327 A1 | 10/2002 | Levitt | |
| 2003/0069014 A1 * | 4/2003 | Raffel et al. | 455/426 |
| 2004/0233930 A1 | 11/2004 | Colby, Jr. | |
| 2004/0268005 A1 | 12/2004 | Dickie | |
| 2005/0159184 A1 | 7/2005 | Kerner et al. | |
| 2006/0003804 A1 | 1/2006 | Liu | |
| 2006/0105722 A1 | 5/2006 | Kumar | |
| 2006/0190321 A1 | 8/2006 | Martins Nicho et al. | |
| 2006/0241353 A1 | 10/2006 | Makino et al. | |
| 2006/0293038 A1 * | 12/2006 | Walter et al. | 455/418 |
| 2007/0004450 A1 | 1/2007 | Parikh | |
| 2007/0018957 A1 | 1/2007 | Seo | |
| 2007/0079030 A1 | 4/2007 | Okuley et al. | |
| 2007/0161404 A1 | 7/2007 | Yasujima et al. | |
| 2007/0189481 A1 * | 8/2007 | Cadiz et al. | 379/142.04 |
| 2007/0288583 A1 | 12/2007 | Rensin et al. | |
| 2008/0009325 A1 | 1/2008 | Zinn et al. | |
| 2008/0040354 A1 | 2/2008 | Ray et al. | |
| 2008/0140886 A1 | 6/2008 | Izutsu | |
| 2008/0231521 A1 | 9/2008 | Anguera Pros et al. | |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

\* cited by examiner

CONVERGED CORDLESS AND CELLULAR PHONE SYSTEM

CROSS REFERENCE TO RELATED APPLICATIONS

This application is a continuation-in-part of assignee's co-pending application U.S. Ser. No. 12/237,399, filed on Sep. 25, 2008 and entitled AUTOMATED CONSUMER ELECTRONICS DEVICE REPORTING, which claims priority (i) from U.S. Ser. No. 60/995,575 filed on Sep. 26, 2007 and entitled AUTOMATED CONSUMER ELECTRONICS DEVICE REPORTING, (ii) from U.S. Ser. No. 61/062,171 filed on Jan. 23, 2008 and entitled MODULAR WIRELESS COMMUNICATOR, (iii) from U.S. Ser. No. 61/063,668 filed on Feb. 5, 2008 and entitled MODULAR WIRELESS COMMUNICATOR, and (iv) from U.S. Ser. No. 61/080,264 filed on Jul. 13, 2008 and entitled AUTOMATED CONSUMER ELECTRONICS DEVICE REPORTING.

FIELD OF THE INVENTION

The present invention relates to telephone systems and, in particular, to cordless phones and cellular phones.

BACKGROUND OF THE INVENTION

Users today generally subscribe to two types of communication systems; namely, fixed line communication systems and cellular communication systems. Cell phones are typically used on-the-go, and fixed phones are typically used in homes and offices. Fixed phones are known to have better sound quality, and their use is less expensive than cell phones.

Many subscribers use cordless phones in their homes. A cordless phone is a wireless unit that communicates via radio waves with a base station that is connected to a fixed telephone line. A cordless phone is operable within a limited range of its base station. The base station attaches to a telephone network in the same way that a conventional corded phone attaches thereto. A cordless phone uses one of a variety of communication protocols, such as Digital Enhanced Cordless Telecommunications (DECT), Personal Handyphone System (PHS) and Bluetooth, each standard differing in frequency band and method of transmission.

When subscribers are in range of their base stations, they are able to communicate using both a cordless phone and a cellular phone. Since cordless phones enjoy the benefits of fixed phones, it is of advantage to subscribers to integrate their cordless phones and cell phones, and have incoming calls to their cell phones forwarded to their cordless phones when the subscribers are in range of their base stations. It is also of advantage to network operators to integrate cordless phones and cell phones. Subscribers benefit by being able to use their cordless phones instead of their cell phones wherever possible. Operators who own both fixed and cellular networks benefit by reductions in traffic over the cellular network.

Prior art stations for integrating cordless and cell phones, such as KX-TH1211 and KX-TH1212, manufactured by Panasonic Corporation of Osaka, Japan, and GE28128EE2, manufactured by General Electric Company of Fairfield, Conn., use "Link-to-Cell" technology. In this regard, reference is now made to FIG. 1, which is a prior art diagram of a combined DECT+cellular system for integrating a cordless phone and a cell phone. As shown in FIG. 1, a cell phone is connected to a single Link-to-Cell base station via Bluetooth, and may be placed anywhere in a vicinity of the base station, ideally in an area with good cellular coverage. When an incoming cellular call is received, the base station rings the cordless phone.

A similar system, the Bluetooth Cell Phone Docking Station ITC-BTTN, manufactured by XLink Technology, Inc. of Milpitas, Calif., operates by connecting a Bluetooth-enabled cell phone with a standard desktop phone, enabling a subscriber to use a regular home or office phone over a cellular service network.

Subscribers often store large amounts of personal data on their cell phones, including inter alia information about contacts, calendar items, themes, ring tones, music and documents. Cordless phones, in distinction, typically store little or none of the subscribers' personal data. As such, use of cordless phones is limiting for subscribers.

U.S. Pat. No. 7,043,248 to Hallenstal et al. describes a mobile terminal that combines a cordless+cell phone. Incoming calls to a phone number of the mobile terminal are connected over a fixed line network if the mobile terminal is within radio coverage of a home base station, and connected over a cellular network if the mobile terminal is out of radio coverage. As such, network operators direct calls over the fixed line network instead of the cellular network, thereby relieving congestion of the cellular network.

According to Hallenstal, the home base station periodically updates the mobile terminal as to whether the subscriber is within range of the base station. This information is stored in an operator database, such as the location database of the fixed line operator, or the home location register (HLR) of the cellular operator.

According to Hallenstal, a subscriber has a single phone number in both cellular and fixed line networks, and thus when an incoming call arrives, the database storing information about the subscriber's location is queried to determine whether the call should be routed via the fixed line network or via the cellular network.

A drawback with the system of Hallenstal is the need for a single phone that is compatible with both the home base station technology, such as DECT, and with the cellular network technology. A further drawback with the system of Hallenstal is incompatibility with existing phone systems.

CSR PLC of Cambridge, England and IVT Corporation of Beijing, China have announced a one-phone combination cordless+cellular system, based on Bluetooth technology. The one-phone combination uses the Cordless Telephony Profile (CTP) within Bluetooth, to enable a Bluetooth-enabled cell phone to switch between cellular and fixed line networks, depending on the subscriber's location. The one-phone combination uses a single phone number for both cellular and fixed line network connections.

A drawback with the one-phone combination is that a single device is generally not suitable for both home/office use and for on-the-go use.

SUMMARY OF THE DESCRIPTION

Aspects of the present invention relate to an integrated cordless+cellular phone system. Embodiments of the present invention enable a plurality of cordless phones and cell phone modules within a household to be combined, and for an incoming call to any of the plural cell phone modules to be correctly routed to the appropriate cordless phone. Outgoing calls may be routed over a fixed line or cellular network, according to subscriber preference.

There is thus provided in accordance with an embodiment of the present invention an integrated cordless and cellular phone system, including a base station for one or more cordless phones, the base station being served by a fixed line telephone network operator, including one or more slots for attaching one or more cellular phone modules therein, the cellular phone modules being served by corresponding cellular network operators, wherein each of the one or more slots is associated with a corresponding cordless phone, and call routing circuitry (i) for identifying an incoming call to the base station as being intended for a specific one of the cellular phone modules, and (ii) for routing the incoming call to the cordless phone that is associated with the slot to which the specific cellular phone module is attached.

There is additionally provided in accordance with an embodiment of the present invention an integrated cordless and cellular phone system, including one or more cordless phones coupled with a base station, each cordless phone comprising a slot for attaching a cellular phone module therein, the cellular phone modules being served by corresponding cellular network operators, and a base station for the one or more cordless phones, the base station being served by a fixed line telephone network operator, including call routing circuitry (i) for identifying an incoming call to the base station as being intended for a specific one of the cellular phone modules, and (ii) for routing the incoming call to the cordless phone to which the specific cellular phone module is attached.

There is further provided in accordance with an embodiment of the present invention a method for integrating cordless and cellular phones, including associating one or more cell phone modules with corresponding one or more cordless phones, each of the one or more cell phone modules including a contact list stored within its memory, receiving an incoming phone call, the incoming call being provided with a calling line identification (CLI), searching the one or more contact lists of the one or more cell phone modules, for the presence of the CLI, and routing the incoming call to the cordless phones associated with those cell phone modules that have the CLI in their contact lists.

There is yet further provided in accordance with an embodiment of the present invention a method for integrating cordless and cellular phones, including associating each of a plurality of cell phone modules with a corresponding one of a plurality of cordless phones, each of the plurality of cell phone modules having an identifier, receiving a forwarded incoming phone call from a caller, automatically prompting the caller to enter an identifier, and routing the forwarded incoming call to the cordless phone associated with the cell phone module that is identified by the identifier entered by the caller.

There is moreover provided in accordance with an embodiment of the present invention a method for integrating cordless and cellular phones, including associating each of a plurality of cell phone modules with a corresponding one of a plurality of cordless phones, each of the plurality of cell phone modules having an identification, receiving a forwarded incoming phone call, the incoming call being provided with a forwarding party's identification, and routing the forwarded incoming call to the cordless phone associated with the cell phone module that is identified by the forwarding party's identification.

There is additionally provided in accordance with an embodiment of the present invention a cell phone module, including a modem for transmitting and receiving voice and data communications that are served by a cellular network operator, a connector for making electrical connection with a jacket having cordless phone functionality, when the cell phone module is attached to the jacket, and a controller (i) for executing programmed instructions for operating the modem, (ii) for transmitting data to and receiving data from the connector, (iii) for automatically sending a notification to the cellular operator to activate call forwarding, thereby forwarding incoming phone calls intended for the cell phone module, to the jacket, when the cell phone module is attached to the jacket, and (iv) for automatically sending a notification to the cellular operator to cancel the call forwarding, when the cell phone module is subsequently detached from the jacket.

There is further provided in accordance with an embodiment of the present invention a method for automated call forwarding, including connecting a cell phone module with a phone system, automatically identifying a fixed line telephone number of the phone system, and automatically initiating call forwarding via a cellular network operator that serves the cell phone module, for calls to the cell phone module to be forwarded to the phone system, based on the identified fixed line telephone number.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to an integrated cordless+cellular phone system that automatically forwards incoming calls for cell phone modules, over a fixed line network to cordless phones.

Embodiments of the present invention use (i) a home cordless system, including a home base station and one or more cordless phones, and (ii) one or more cell phone modules. The cell phone modules may be attached to and detached from the cordless system. In one embodiment the cell phone modules attach to and detach from the home base station, and in another embodiment the cell phone modules attach to and detach from the cordless phones. In both embodiments, when a cell phone module is attached to the cordless system, a notification is automatically sent to the cellular network, and calls to the cell phone module are automatically forwarded to the home base station. Similarly, when the cell phone module is detached from the cordless system, another notification is automatically sent to the cellular network, and the call forwarding is cancelled.

Home cordless systems often include multiple cordless phones, for various members of the household. Additionally, the various members of the household often have their own cell phone modules. It may thus be appreciated that if multiple cell phone modules are simultaneously forwarded to the home base station, the base station must be able to determine, for each incoming call, for whom the call is intended. Otherwise, a member of the household may receive a call intended for another member, which is annoying.

Figure 1:
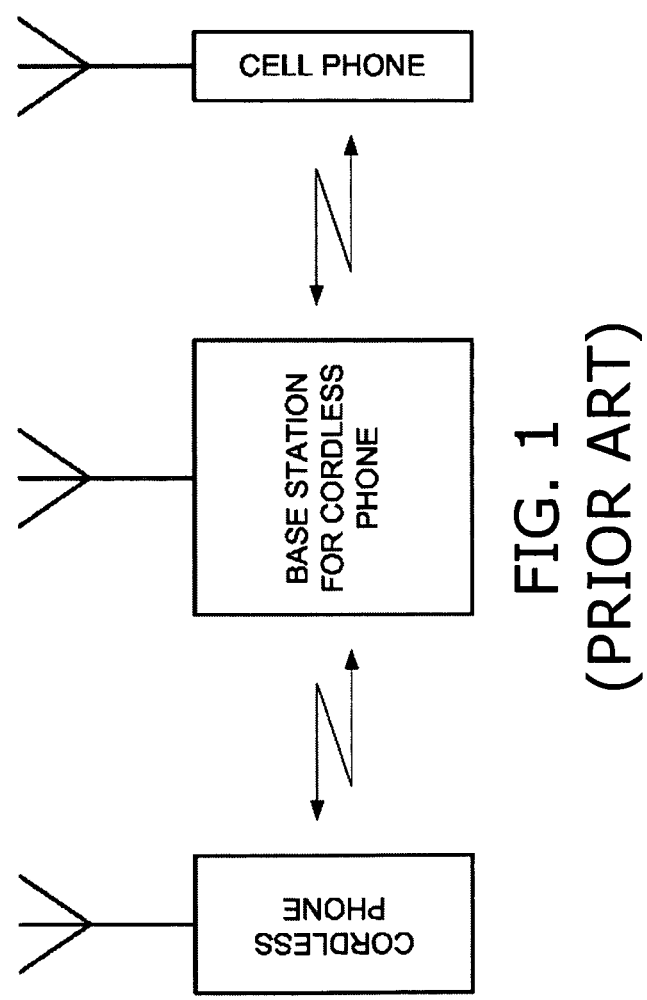
FIG. 1 is a prior art diagram of a combined DECT+cellular system for integrating a cordless phone and a cell phone.
Figure 2:
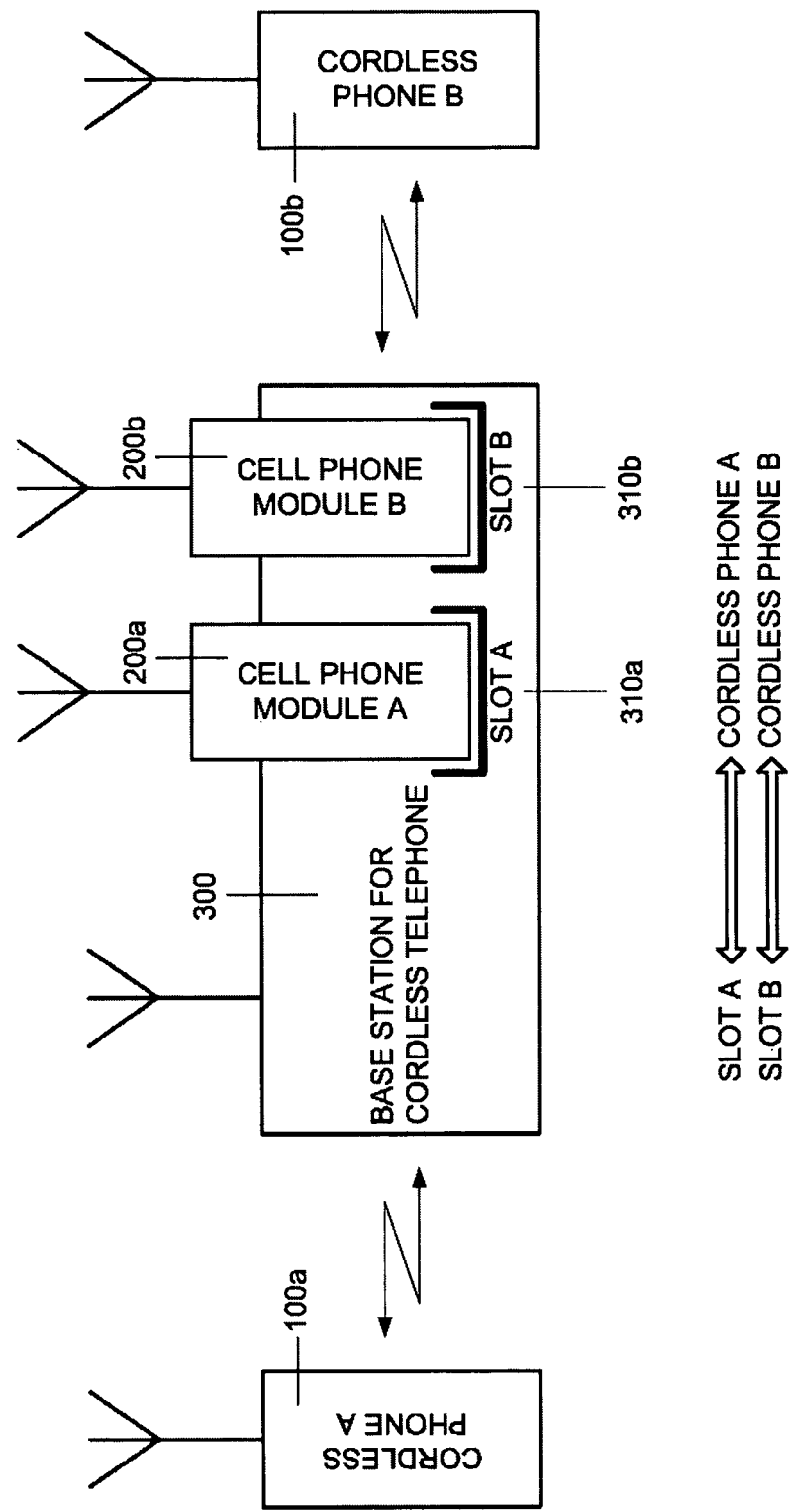
FIG. 2 is a simplified diagram of a system for combining one or more cordless and cellular phone modules, in accordance with an embodiment of the present invention wherein the cellular phone modules attach to a cordless home base station.

Reference is now made to FIG. 2, which is a simplified diagram of a system for combining one or more cordless phones and cell phone modules, in accordance with an embodiment of the present invention wherein the cell phone modules attach to a cordless home base station. Shown in FIG. 2 are two cordless phones, designated 100a and 100b, used by two members of a household. Correspondingly, the two members have cell phone modules, designated 200a and 200b. The cordless phones are linked to a home base station, designated 300. Home base station 300 includes two slots, designated 310a and 310b, for attaching respective cell phone modules 200a and 200b. In accordance with an embodiment of the present invention, slot 310a is associated with cordless phone 100a, and slot 310b is associated with cordless phone 100b.

Units 200a and 200b are referred to herein as "cell phone modules", rather than "cell phones", because these units may or may not be operative as standalone cell phones when detached from base station 300. In some embodiments of the present invention, cell phone modules 200a and 200b are operative as standalone cell phones when detached from base station 300. In other embodiments of the present invention, cell phone modules 200a and 200b are not operative as standalone cell phones when detached from base station 300. In yet other embodiments of the present invention, one of cell phone modules 200a and 200b is operative as a standalone cell phone, and the other cell phone module is not operative as a standalone cell phone.

It will be appreciated by those skilled in the art that the system of FIG. 2 may accommodate more than two cordless phones and two cell phone modules, and that the use of two cordless phones and two cell phone modules is for purposes of illustration and exposition only.

When cell phone module 200a is attached to home base station 300 via its slot 310a, a notification is automatically sent to the cellular network, and incoming calls for cell phone module 200a are automatically forwarded to home base station 300. Similarly, when cell phone module 200b is attached to its slot 310b, incoming calls for cell phone module 200b are automatically forwarded to home base station 300.

Figure 3:
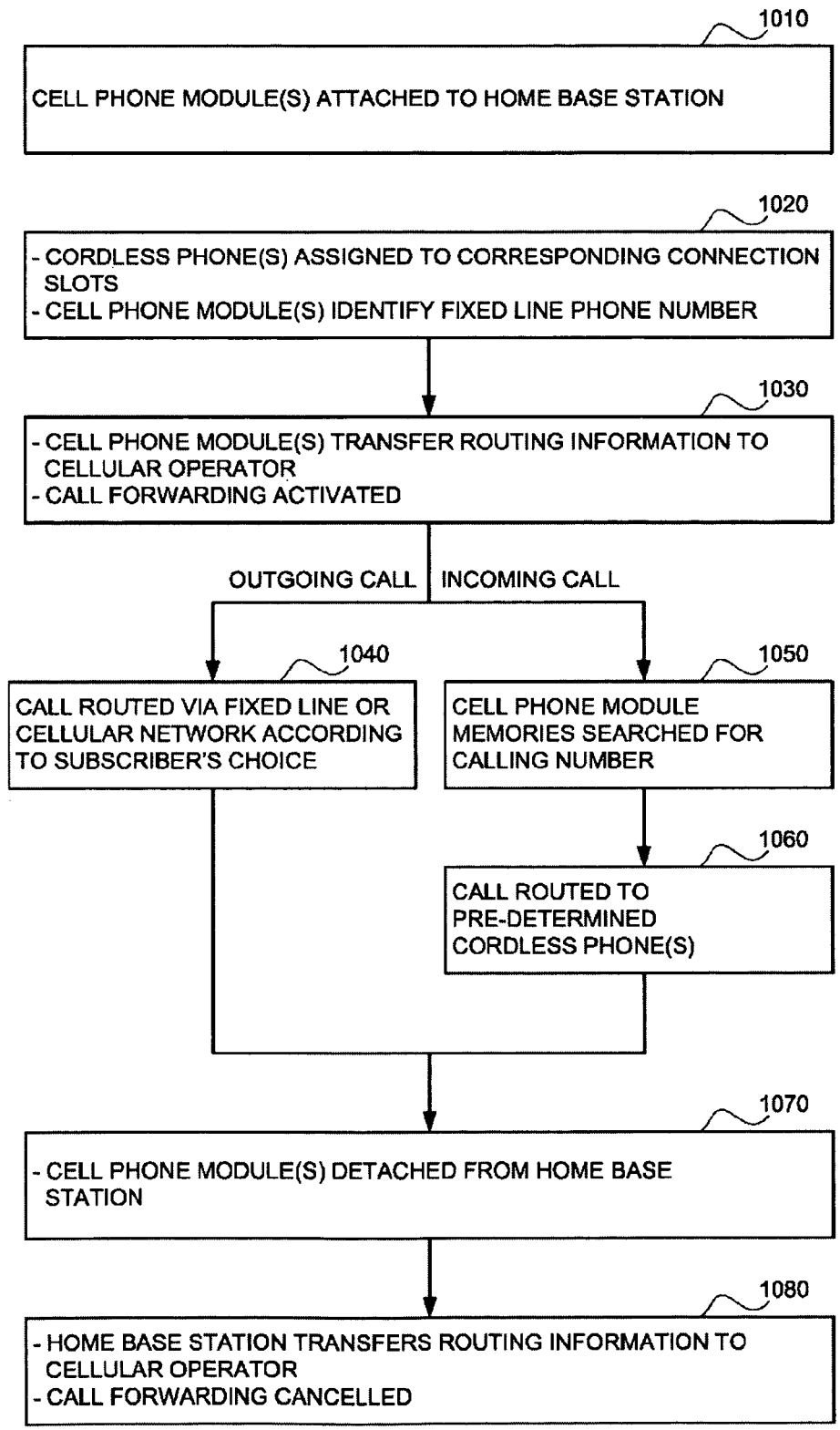
FIG. 3 is a simplified flowchart of a method for combining one or more cordless and cellular phone modules, in accordance with an embodiment of the present invention wherein the cellular phone modules attach to a cordless home base station.

When an incoming call is received by base station 300, special logic within the base station determines to which member of the household the call is intended, and connects the call to the appropriate cordless phone 100a or 100b. In this regard, reference is now made to FIG. 3, which is a simplified flowchart of a method for combining one or more cordless phones and cell phone modules, in accordance with an embodiment of the present invention wherein the cell phone modules attach to a cordless home base station. At step 1010 one or more subscribers attach one of more cell phone modules to respective slots in a cordless home base station. Each slot is associated with a corresponding cordless phone.

At step 1020 the one or more cell phone modules identify the fixed line phone number of the home base station. There are several ways in which the cell phone modules may identify the fixed line phone number at step 1020. The fixed line phone number may have been entered manually into the cell phone modules' memories. Alternatively, when each cell phone module is first attached to the home base station, the home base station may dial the cell phone module, manually or automatically, and the cell phone module may thus identify the home base station fixed line phone number through the calling line identification (CLI).

Upon attachment of the cell phone modules, notifications are automatically sent to the cellular operator at step 1030, and call forwarding from the cell phone modules to the base station is activated. There are several ways in which call forwarding may be activated at step 1030. Each cell phone module may automatically send a message to the cellular operator, as described in applicant's co-pending patent application U.S. Ser. No. 12/237,399 entitled AUTOMATED CONSUMER ELECTRONICS DEVICE REPORTING. Alternatively, each cell phone module may automatically send a conventional call forwarding activation code.

Outgoing calls from the cordless phones are routed over the fixed line network, as is normally done for such calls. However, in accordance with an embodiment of the present invention, the subscriber may instruct the base station to route a call via the cellular network. Although cellular calls are generally more expensive than fixed line calls, it may nevertheless be of advantage to route outgoing calls via the cellular network in case, for example, the subscriber has unused free or discounted minutes remaining in a cellular monthly plan or such other incentive program. Thus at step 1040 an outgoing call is routed either via the fixed line network or the cellular network, according to the subscriber's choice.

When an incoming call is made to one of the cell phone modules, the incoming call, together with the calling party's calling line identification (CLI), is automatically forwarded to the home base station. For most operator networks, the CLI is transmitted along with the incoming call. At step 1050, the base station scans the cell phone modules' memories to search for the presence of the CLI in one or more of the cell phone modules' contact lists.

If the CLI is found in one of the cell phone modules' contact lists, then the incoming call is transmitted to the corresponding cordless phone at step 1060. Moreover, the ring tone of the cell phone module is used as the ring tone for the corresponding cordless phone. Playing the ring tone of the cell phone module for the corresponding cordless phone is achieved by controlling the cell phone module to play its ring tone using the DECT as a speaker. Alternatively, each cell phone module's ring tone may be synchronized with the corresponding cordless phone.

If the CLI is found in two or more of the cell phone modules' contact lists, then the incoming call is transmitted to each of the two or more corresponding cordless phones at step 1060. The ring tone of each of the two or more cell phone modules is used as the respective ring tone for each of the corresponding two or more cordless phones. If the CLI is not found in any of the cell phone modules' contact lists, then the incoming call is routed to the cordless phones using the cordless phones' default ring tones at step 1060.

In another embodiment of the present invention, the DECT system answers the call and prompts the caller for an identifier, which is used to route the call to the appropriate cordless phone.

At step 1070, one or more cell phone modules are detached from the base station. At step 1080, the base station automatically sends one or more notifications to the appropriate cellular operators, and call forwarding for the cell phone modules is cancelled. As above, step 1080 may be performed by the one or more cell phone modules sending a message or a conventional call forwarding cancellation code to the cellular operator.

Some operators include an additional data field in the CLI, with a forwarding party's identification. Specifically, if caller A calls communicator B, and communicator B forwards the call to a DECT landline number, the DECT system may retrieve communicator B's ID, and thus forward the call to the appropriate cordless phone. Such a service is variously referred to as Dialed Number Identification Service (DNIS), as Direct Inward Dialing (DID), or as Direct Dial-In (DDI). DNIS is generally provided by telecommunications companies to corporate clients, which enables them to determine which telephone number was dialed by a customer. This is useful in determining how to answer an incoming call.

The forwarding party's identification may also be included in the Multiple Data Message Format (MDMF). When the home base station receives such an incoming call, the home base station identifies the cell phone module that was called, and connects the call to the corresponding cordless phone. In this embodiment, step 1050 is not necessary, and the incoming call is properly routed even if the caller CLI is not present in any of the contact lists.

For integrating the present invention with DNIS, the DECT system is provided with phone numbers of the various cell phone modules. Users may manually provide their cell phone numbers upon first connection. Alternatively, upon first connection a user is prompted to call the landline number, and the DECT system then uses the CLI of the incoming call to automatically identify the phone number of the calling cell phone module.

Figure 4:
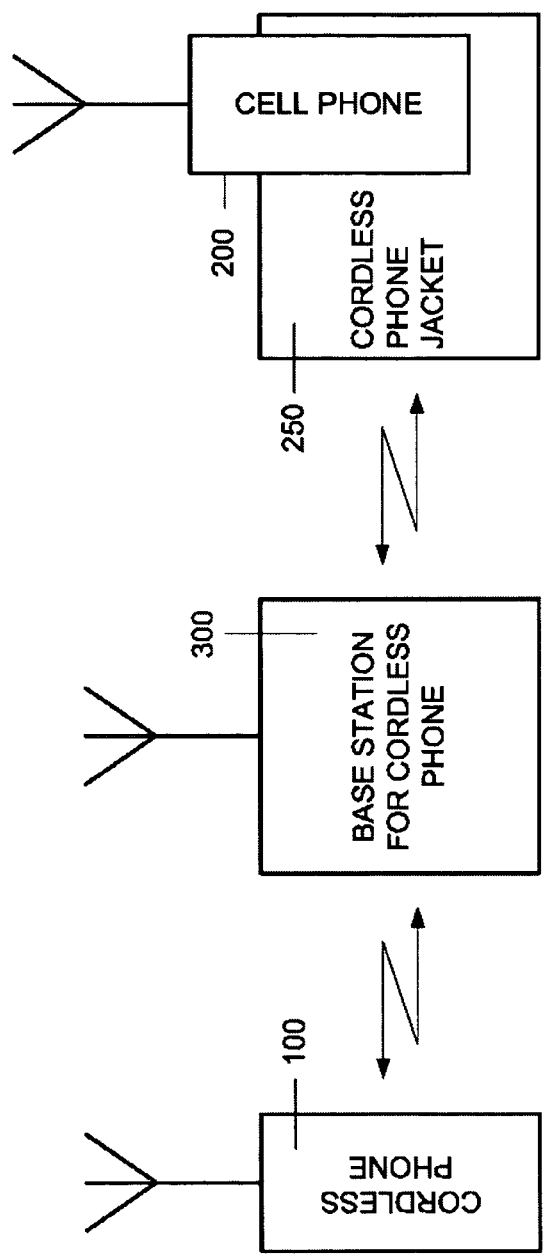
FIG. 4 is a simplified diagram of a system for combining one or more cordless phones and cell phone modules, in accordance with an embodiment of the present invention wherein the cellular phone modules attach to the cordless phones.

Reference is now made to FIG. 4, which is a simplified diagram of a system for combining one or more cordless phones and cell phone modules, in accordance with an embodiment of the present invention wherein the cell phone modules attach to the cordless phones. The system shown in FIG. 4 includes a cordless phone system, having a cordless phone 100 and a home base station 300, and a cell phone module 200.

In some embodiments of the present invention, cell phone module 200 attaches to a cordless phone jacket 250. A jacket is defined herein to mean a device that provides an enhanced user interface for the cell phone module, and enriches the capabilities of the cell phone module. The cell phone module operates in conjunction with the jacket when attached thereto. As indicated hereinabove, the cell phone module may or may not also operate as a standalone device, depending on the specific embodiment of the present invention.

Figure 5:
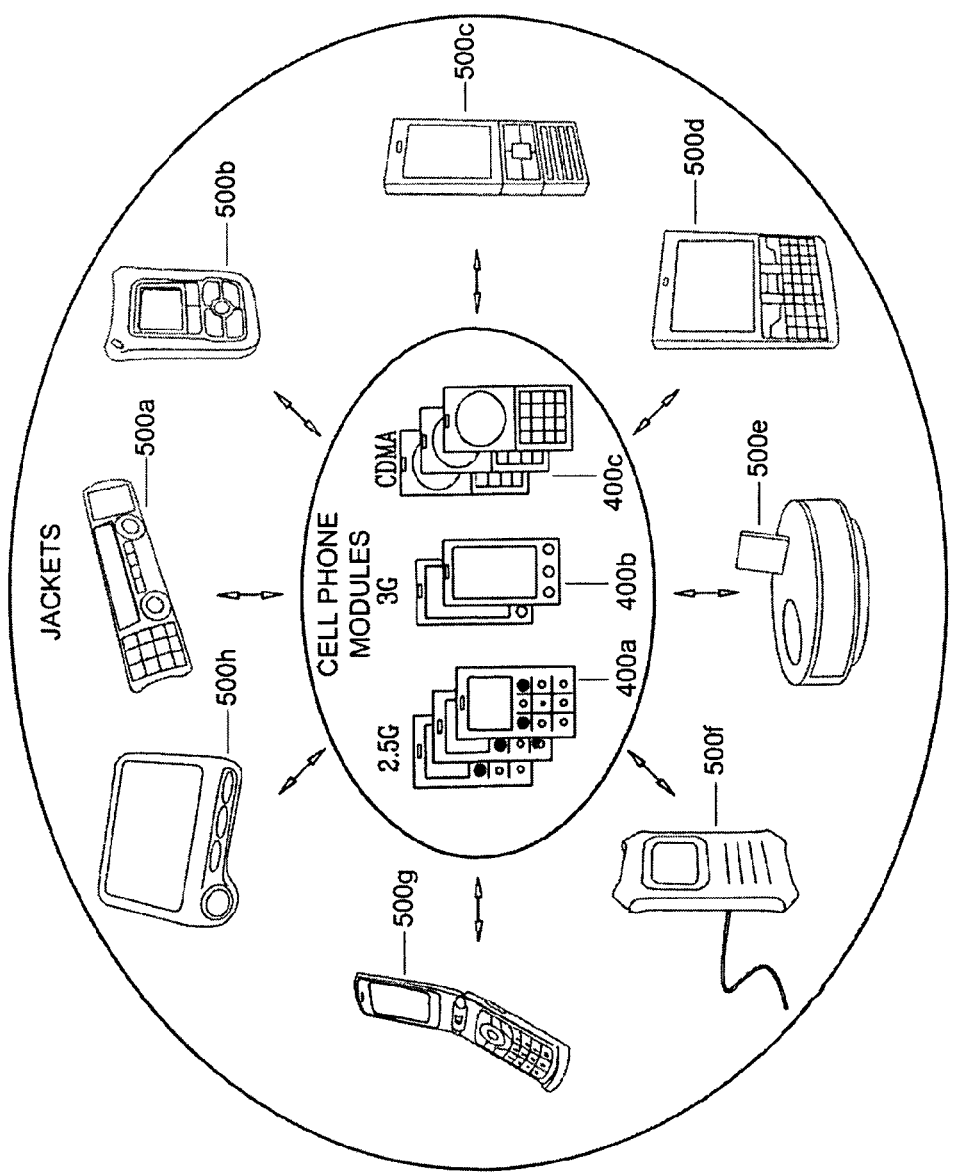
FIG. 5 is an illustration of a communication system with wireless communicators and jackets, constructed and operative in accordance with an embodiment of the present invention.

Reference is now made to FIG. 5, which is an illustration of a communication system with cell phone modules and jackets, constructed and operative in accordance with an embodiment of the present invention. Shown in FIG. 5 are cell phone modules, designated 400a-400c, including 2.5G modules for a GSM network, 3G modules for a GSM network, and CDMA modules for a CDMA network. It will be appreciated by those skilled in the art that the networks illustrated in FIG. 5 are exemplary of a wide variety of networks and communication protocols that are supported by the cell phone modules of the present invention, such networks and communication protocols including inter alia WiFi, Bluetooth and WiMax.

Also shown in FIG. 5 are jackets, designated 500a-500h. In accordance with an embodiment of the present invention, each module 400a-400c may be attached to any of jackets 500a-500h, so as to operate in combination therewith. Cell phone modules 400a-400c are substantially of the same form factor and, as such, are able to be attached to each of jackets 500a-500h.

Figure 6:
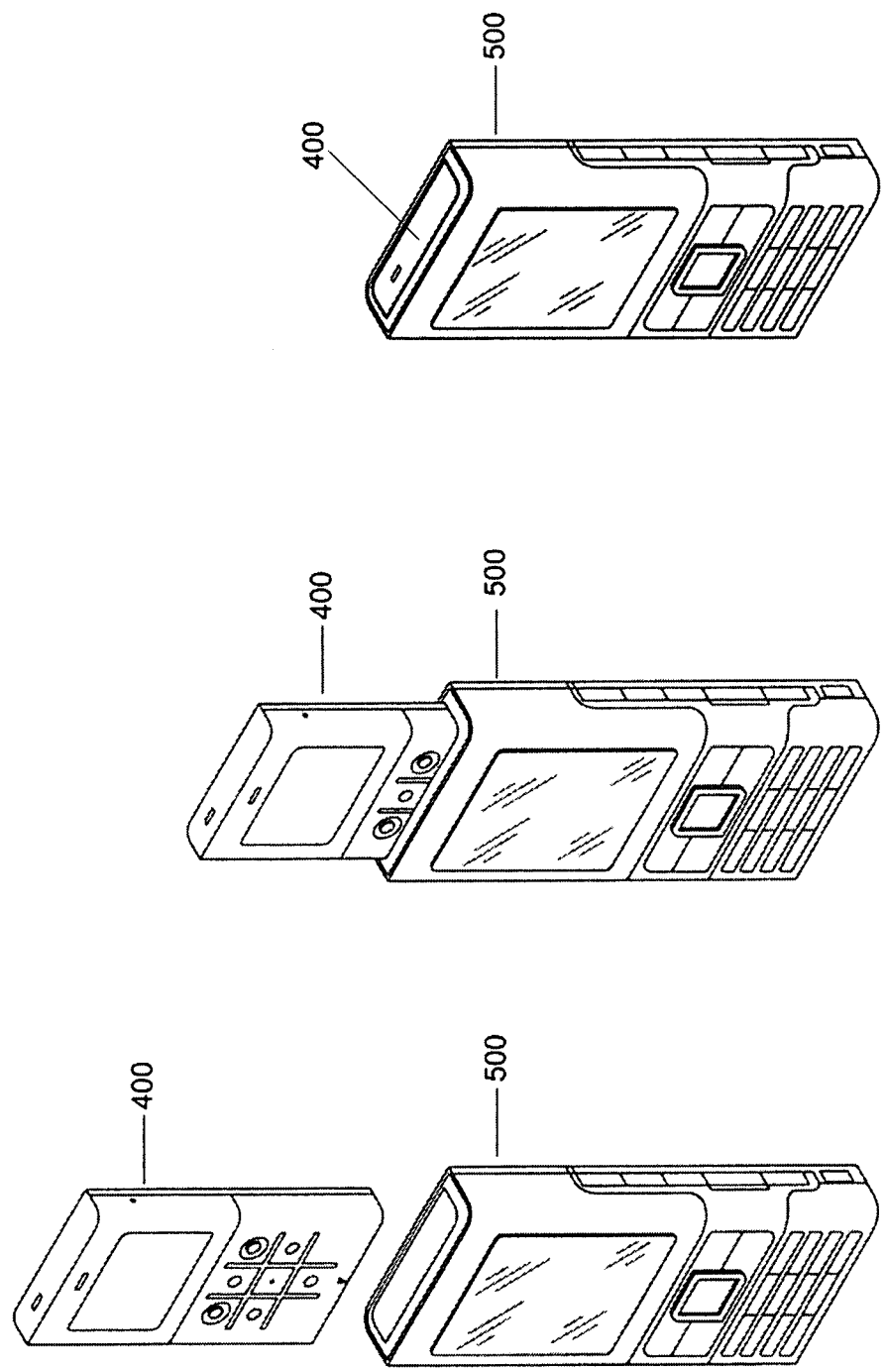
FIG. 6 is an illustration of a wireless communicator being attached to a jacket, in accordance with an embodiment of the present invention.

Reference is further made to FIG. 6, which is an illustration of a cell phone module 400 being attached to a jacket 500, in accordance with an embodiment of the present invention. Jacket 500 as shown in FIG. 6 includes a hollow cavity at the top for inserting cell phone module 400 therein.

Figure 7:
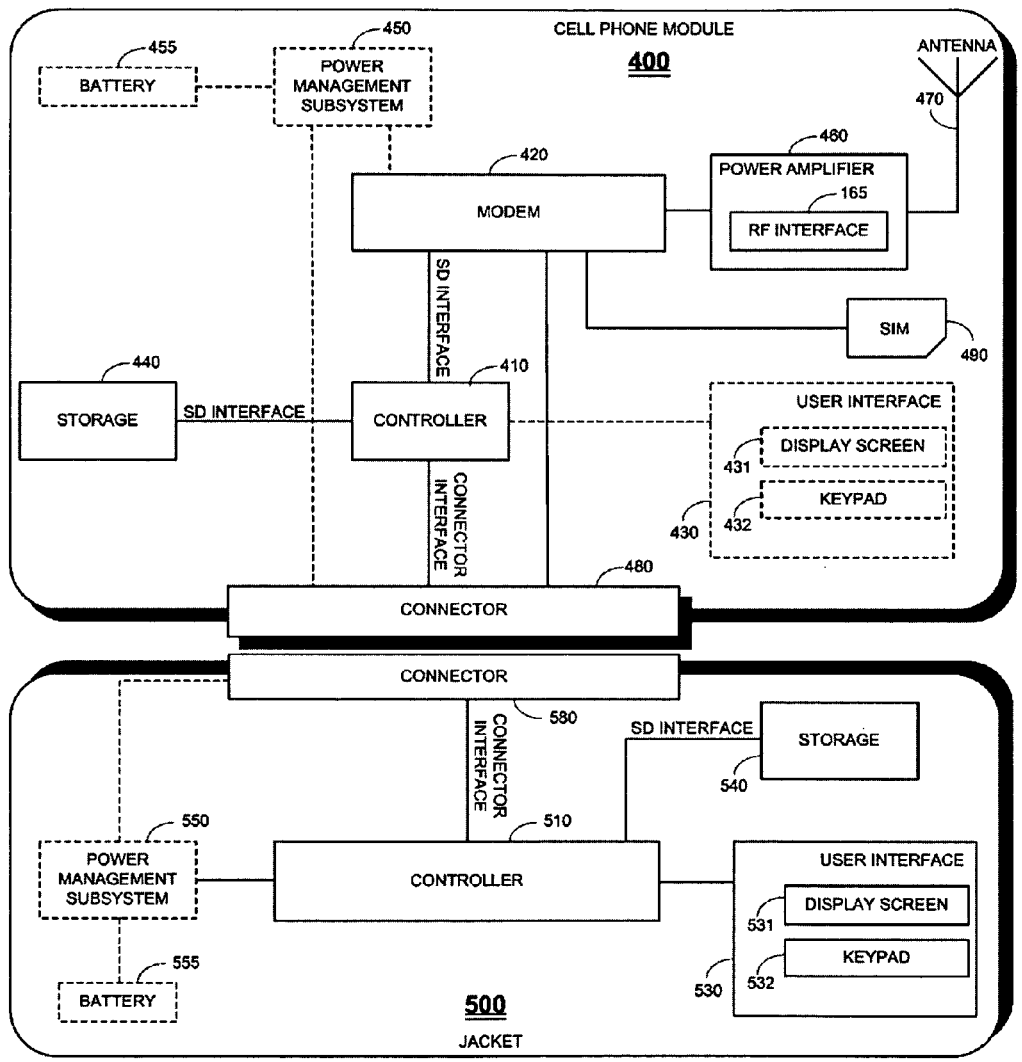
FIG. 7 is a simplified block diagram of a wireless communicator and a jacket, in accordance with an embodiment of the present invention.

Reference is now made to FIG. 7, which is a simplified block diagram of cell phone module 400 and jacket 500, in accordance with an embodiment of the present invention. Cell phone module 400 includes seven primary components, as follows: a controller 410, a modem 420 for sending and receiving voice and data, a memory storage 440, a power amplifier 460, an antenna 470, a connector 480 for connecting the module to jacket 500 when the module is attached thereto, and a subscriber identification module (SIM) 490.

Controller 410 executes programmed instructions that control the data flow between cell phone module 400 and jacket 500. Modem 420 controls the communication functionality of module 400. Power amplifier 460 includes a radio frequency (RF) interface 465, and is connected to antenna 470.

Cell phone module 400 also includes two optional components; namely, a user interface 430 and a power management subsystem 450.

User interface 430 includes a display screen 431 and a keypad 432. User interface 430 may optionally include additional components (not shown) such as a microphone, a headset audio jack, an earpiece, a mono speaker or stereo speakers, and a vibrator. Power management subsystem 450 includes charging circuitry for charging a battery 455.

In accordance with an embodiment of the present invention, the interface between controller 410 and storage 440, and the interface between controller 410 and modem 420, are both SD interfaces. The interface between controller 410 and connector 480 is a custom interface.

Jacket 500 includes four primary components, as follows: a controller 510, a user interface 530, a memory storage 540, and a connector 580 for connecting the jacket to cell phone module 400 when module 400 is attached to the jacket. Jacket 500 may include an optional power management subsystem 550 and an optional battery 555.

User interface 530 includes a display screen 531 and a keypad 532. User interface 530 may optionally include additional components (not shown), such as a microphone, a headset audio jack, an earpiece, a mono speaker or stereo speakers, and a vibrator.

In accordance with an embodiment of the present invention, the interface between controller 510 and storage 540 is an SD interface. The interface between controller 510 and connector 580 is a custom interface.

Figure 8:
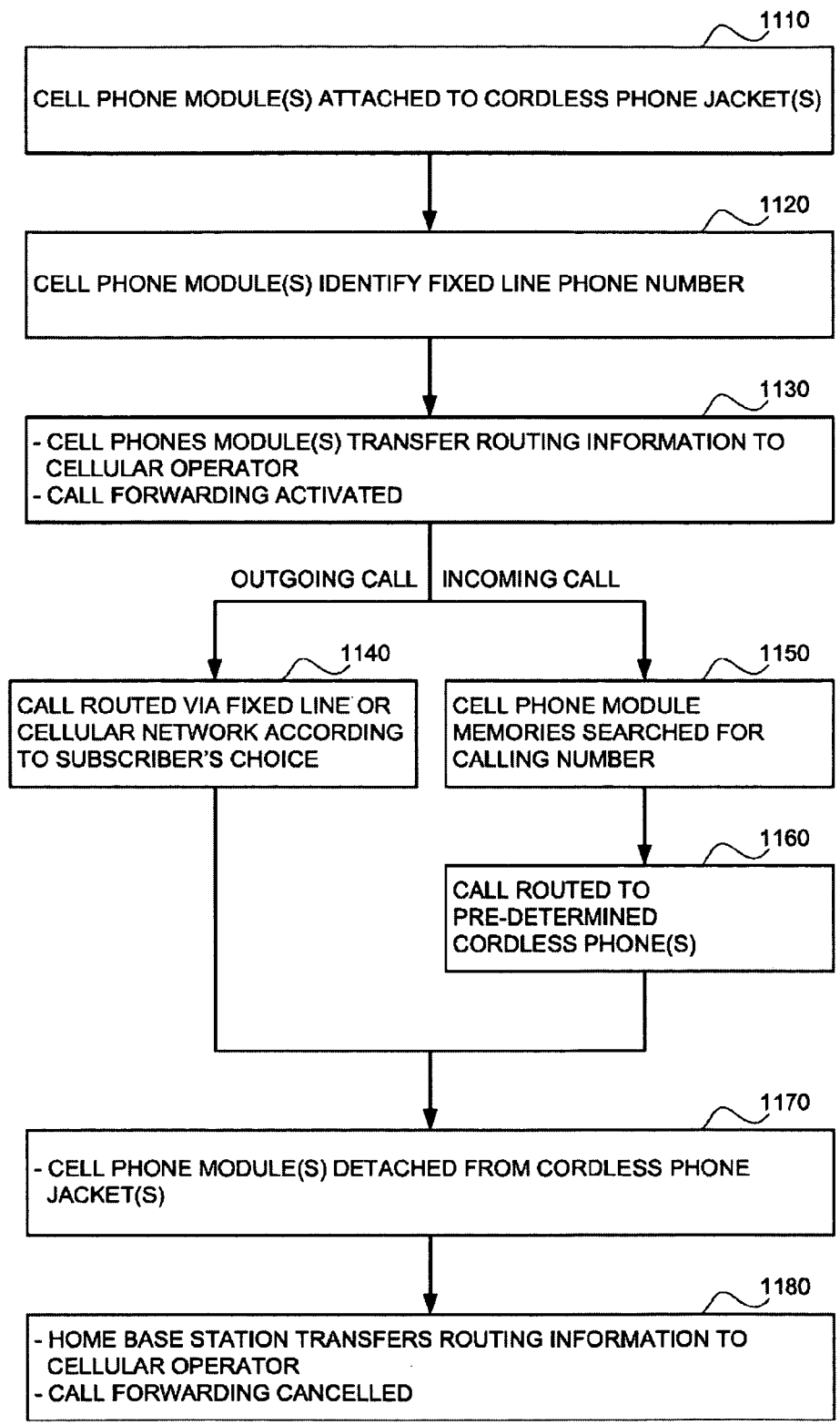
FIG. 8 is a simplified flowchart of a method for combining one or more cordless phones and cellular phone modules, in accordance with an embodiment of the present invention wherein the cellular phone modules attach to cordless phone jackets.

Reference is now made to FIG. 8, which is a simplified flowchart of a method for combining one or more cordless phones and cellular phone modules, in accordance with an embodiment of the present invention wherein the cellular phone modules attach to cordless phone jackets. At step 1110 one or more subscribers attach one or more cell phone modules to corresponding one or more cordless phone jackets.

At step 1120 the one or more cell phone modules obtain the fixed line phone number of the cordless phone base station. There are several ways in which the cell phone modules may identify the fixed line phone number at step 1120. The fixed line phone number may have been entered manually into the cell phone modules' memories. Alternatively, when each cell phone module is first attached to a cordless phone, the home base station may dial the cell phone module, manually or automatically, and the cell phone module may thus identify the home base station fixed line phone number through the calling line identification (CLI).

Upon attachment of the cell phone modules, notifications are automatically sent to the cellular operator at step 1130, and call forwarding from the cell phone modules to the base station is activated. There are several ways in which call forwarding may be activated at step 1130. Each cell phone module may automatically send a message to the cellular operator, as described in applicant's co-pending patent application U.S. Ser. No. 12/237,399 entitled AUTOMATED CONSUMER ELECTRONICS DEVICE REPORTING. Alternatively, each cell phone module may automatically send a conventional call forwarding activation code.

Outgoing calls from the cordless phones are routed over the fixed line network, as is normally done for such calls. However, in accordance with an embodiment of the present invention, the subscriber may instruct the base station to route a call via the cellular network. Although cellular calls are generally more expensive than fixed line calls, it may nevertheless be of advantage to route outgoing calls via the cellular network in case, for example, the subscriber has unused free or discounted minutes remaining in a cellular monthly plan or such other incentive program. Thus at step 1140 an outgoing call is routed either via the fixed line network or the cellular network, according to the subscriber's choice.

When an incoming call is made to one of the cell phone modules, the incoming call, together with the calling party's calling line identification (CLI), is automatically forwarded to the home base station. At step 1150, the base station scans the cell phone modules' memories to search for the presence of the CLI in one of more of the cell phone modules' contact lists.

If the CLI is found in one of the cell phone modules' contact lists, then the incoming call is transmitted to the cordless phone to whose jacket the cell phone module is attached, at step 1160. Moreover, the ring tone of the cell phone module is used as the ring tone for the cordless phone.

If the CLI is found in two or more of the cell phone modules' contact lists, then the incoming call is transmitted to the two or more cordless phones to whose jackets the two or more cell phone modules are attached, at step 1160. The ring tone of each of the two or more cell phone modules is used as the respective ring tone for each of the two or more cordless phones. If the CLI is not found in any of the cell phone modules' contact lists, then the incoming call is routed to the cordless phones using the cordless phones' default ring tones at step 1160.

At step 1170, one or more cell phone modules are detached from the cordless phone jackets. At step 1180 one or more notifications are automatically sent to the appropriate cellular operators, and call forwarding for the cell phone modules is cancelled. As above, step 1180 may be performed by the one or more cell phone modules sending messages or conventional call forwarding cancellation codes to the cellular operator.

In some embodiments of the present invention, both the caller CLI and the CLI of the number that was dialed by the caller, i.e., the cell phone number that the caller dialed, are provided with an incoming call. When the home base station receives such an incoming call, the home base station identifies the cell phone module that was called, and connects the call to the corresponding cordless phone to whose jacket the cell phone module is attached. In this embodiment, step 1150 is not necessary, and the incoming call is properly routed even if the caller CLI is not present in any of the contact lists.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An integrated cordless and cellular phone system, comprising:
    a base station for a plurality of cordless phones, the base station being served by a land line telephone network operator and having a land line telephone number associated therewith, and the base station being able to route an incoming call to any specific one of the cordless phones, comprising:
    a plurality of slots for physically inserting a plurality of cellular phone modules therein, the cellular phone modules being distinct from the cordless phones and being served by corresponding cellular network operators, wherein each of the plurality of slots is associated with a corresponding cordless phone, and wherein at least one of the cellular phone modules is operative as a standalone cell phone when it is detached from the base station; and
    call routing circuitry (i) for identifying an incoming call to the land line telephone number associated with the base station as being intended for a specific one of the plurality of cellular phone modules, and (ii) for routing the incoming call to and only to the cordless phone that is associated with the slot to which the specific cellular phone module is attached.

2. The integrated cordless and cellular phone system of claim 1, wherein at least one of the cellular phone modules is not operative as a standalone cell phone when detached from the base station.

3. The integrated cordless and cellular phone system of claim 1, further comprising call forwarding circuitry (i) for automatically instructing the corresponding cellular network operator to activate call forwarding, thereby forwarding incoming phone calls intended for any given one of the cellular phone modules, to the base station, in response to the given cellular phone module being attached to the base station, and (ii) for automatically instructing the cellular network operator to deactivate the call forwarding, in response to the given cellular phone module being detached from the base station.

4. The integrated cordless and cellular phone system of claim 1, wherein said call routing circuitry routes an outgoing call made by a caller from one of the cordless phones to the cellular network, if instructed by the caller to do so, and routes the outgoing call to the land line telephone network otherwise.

5. An integrated cordless and cellular phone system, comprising:
    a plurality of cordless phones coupled with a base station, each cordless phone comprising a slot for physically inserting a cellular phone module therein, the cellular phone modules being distinct from the cordless phones and being served by corresponding cellular network operators, and wherein at least one of the cellular phone modules is operative as a standalone cell phone when it is detached from the base station; and a base station for said plurality of cordless phones, the base station being served by a land line telephone network operator and having a land line telephone number associated therewith, comprising call routing circuitry (i) for identifying an incoming call to the land line telephone number associated with the base station as being intended for a specific one of the cellular phone modules, and (ii) for routing the incoming call to and only to the cordless phone to which the specific cellular phone module is attached.

6. The integrated cordless and cellular phone system of claim 5, wherein at least one of the cellular phone modules is not operative as a standalone cell phone when detached from the base station.

7. The integrated cordless and cellular phone system of claim 5 further comprising call forwarding circuitry (i) for automatically instructing the corresponding cellular network operator to activate call forwarding, thereby forwarding incoming phone calls intended for any given one of the cellular phone modules, to the base station, in response to the given cellular phone module being attached to the base station, and (ii) for automatically instructing the cellular network operator to deactivate the call forwarding, in response to the given cellular phone module being detached from the base station.

8. The integrated cordless and cellular phone system of claim 5, wherein said call routing circuitry routes an outgoing call made by a caller from one of the cordless phones to the cellular network, if instructed by the caller to do so, and routes the outgoing call to the land line telephone network otherwise.

9. The integrated cordless and cellular phone system of claim 1 wherein said base station receives a calling line identification (CLI) for an incoming call from the land line telephone network operator, wherein the plurality of cellular phone modules include memories that store respective contact lists, and wherein said call routing circuitry searches for the presence of the CLI in the contact lists.

10. The integrated cordless and cellular phone system of claim 1 wherein said base station prompts a caller to enter an identifier for the cellular phone module being called.

11. The integrated cordless and cellular phone system of claim 1 wherein said base station receives a calling line identification (CLI) for an incoming call from the land line telephone network operator, the CLI including a dialed number identification.

12. The integrated cordless and cellular phone system of claim 11 wherein said base station receives the CLI from a Dialer Number Identification Service.

13. The integrated cordless and cellular phone system of claim 1 wherein said base station receives a dialed number identification for an incoming call within a Multiple Data Message Format.

14. The integrated cordless and cellular phone system of claim 5 wherein said base station receives a calling line identification (CLI) for an incoming call from the land line telephone network operator, wherein the plurality of cellular phone modules include memories that store respective contact lists, and wherein said call routing circuitry searches for the presence of the CLI in the contact lists.

15. The integrated cordless and cellular phone system of claim 5 wherein said base station prompts a caller to enter an identifier for the cellular phone module being called.

16. The integrated cordless and cellular phone system of claim 5 wherein said base station receives a calling line identification (CLI) for an incoming call from the land line telephone network operator, the CLI including a dialed number identification.

17. The integrated cordless and cellular phone system of claim 16 wherein said base station receives the CLI from a Dialer Number Identification Service.

18. The integrated cordless and cellular phone system of claim 5 wherein said base station receives a dialed number identification for an incoming call within a Multiple Data Message Format.

* * * * *